US011412297B2

(12) United States Patent
Osman et al.

(10) Patent No.: US 11,412,297 B2
(45) Date of Patent: Aug. 9, 2022

(54) INFLUENCER TOOLS FOR STREAM CURATION BASED ON FOLLOWER INFORMATION

(71) Applicant: Sony Interactive Entertainment Inc., Tokyo (JP)

(72) Inventors: Steven Osman, San Mateo, CA (US); Katrine K. Chow, San Mateo, CA (US); Saket Kumar, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/378,602

(22) Filed: Jul. 16, 2021

(65) Prior Publication Data

US 2022/0021933 A1  Jan. 20, 2022

Related U.S. Application Data

(60) Provisional application No. 63/052,903, filed on Jul. 16, 2020.

(51) Int. Cl.
*H04N 21/442* (2011.01)
*A63F 13/79* (2014.01)
(Continued)

(52) U.S. Cl.
CPC ....... *H04N 21/44204* (2013.01); *A63F 13/79* (2014.09); *A63F 13/85* (2014.09);
(Continued)

(58) Field of Classification Search
CPC ......... H04N 21/44204; H04N 21/2187; H04N 21/4668; A63F 13/79; A63F 13/86; G06Q 50/01; G06F 16/9535
See application file for complete search history.

(56) References Cited

U.S. PATENT DOCUMENTS 9,078,048 B1  7/2015  Gargi et al.
9,420,353 B1  8/2016  Gargi et al.
(Continued)

OTHER PUBLICATIONS

PCT/US2021/037963, Notification of Transmittal of the International Search Report and the Written Opinion of the International Searching Authority, or the Declaration, PCT/ISA/220, and the International Search Report, PCT/ISA/210, dated Sep. 29, 2021.
(Continued)

*Primary Examiner* — Nnenna N Ekpo
(74) *Attorney, Agent, or Firm* — Penilla IP, APC

(57) ABSTRACT

Methods and systems are provided for recommending content channels for an influencer. The method includes identifying a session of the influencer. The session includes a current content channel being viewed by the influencer and made available for streaming to one or more followers of the influencer. The current content channel is one of a plurality of content channels made available for viewing by the influencer. The method includes accessing, during the session, content data from the plurality of content channels. The content data is associated with gameplay of one or more players engaged in gameplay. The method includes accessing profile data of the followers of the influencer. The profile data includes content preferences of said followers. The method includes predicting engagement metrics for said followers of the influencer in relation to said plurality of content channels. The engagement metrics are updated in substantial real time based on change occurring with the content data in plurality of content channels. The method includes generating an influencer interface for presenting said predicted engagement metrics. The engagement metrics are configured to provide indicators of when engagement metrics for the current content channel indicate a predicted decrease relative to a predicted increase when switching to
(Continued)

a different content channel from among the plurality of content channels available during the session.

18 Claims, 9 Drawing Sheets

(51) Int. Cl.
*A63F 13/85* (2014.01)
*G06F 16/9535* (2019.01)
*G06Q 50/00* (2012.01)
*H04N 21/2187* (2011.01)
*H04N 21/466* (2011.01)

(52) U.S. Cl.
CPC ......... *G06F 16/9535* (2019.01); *G06Q 50/01* (2013.01); *H04N 21/2187* (2013.01); *H04N 21/4668* (2013.01)

(56) References Cited

U.S. PATENT DOCUMENTS

| | | |
|---|---|---|
| 2007/0226761 A1 | 9/2007 | Zalewski et al. |
| 2010/0122286 A1 | 5/2010 | Begeja et al. |
| 2014/0040944 A1 | 2/2014 | Zalewski et al. |
| 2014/0298363 A1 | 10/2014 | Begeja et al. |
| 2018/0061456 A1 | 3/2018 | Martinez et al. |
| 2019/0262724 A1 | 8/2019 | Trombetta et al. |
| 2020/0322684 A1* | 10/2020 | Dong ................ H04N 21/4668 |
| 2021/0016190 A1 | 1/2021 | Trombetta et al. |
| 2021/0027184 A1* | 1/2021 | Heuser ................... A63F 13/79 |

OTHER PUBLICATIONS

PCT/US2021/037962, Notification of Transmittal of the International Search Report and the Written Opinion of the International Searching Authority, or the Declaration, PCT/ISA/220, and the International Search Report, PCT/ISA/210, dated Oct. 18, 2021.

* cited by examiner

INFLUENCER TOOLS FOR STREAM CURATION BASED ON FOLLOWER INFORMATION

CLAIM OF PRIORITY

This application claims priority under 35 U.S.C. 119(e) to U.S. Provisional Patent Application No. 63/052,903 filed Jul. 16, 2020, entitled "INFLUENCER TOOLS FOR STREAM CURATION BASED ON FOLLOWER INFORMATION," the disclosure of which is incorporated herein by reference in its entirety for all purposes.

BACKGROUND

1. Field of the Disclosure

The present disclosure relates generally to identifying recommended content that can be selected by an influencer to increase the influencer's following.

2. Description of the Related Art

Digital marketing has seen many changes over the years with the growth of social media. In particular, influencer marketing which involves endorsements and product placement by influencers (e.g., people and organizations who have a purported expert level of knowledge or social influence in their field) has risen in popularity over the years. To this end, developers have been seeking ways to develop sophisticated tools to assist influencers while they are "influencing," e.g., creating entertaining content, reviewing video games, commentating on a sporting events, endorsing products, etc.

A growing trend in digital marketing is the growth of influencer marketing which involves businesses collaborating with influencers to endorse their product, services, brand, etc. Generally, influencers are paid to endorse a product, service, brand, etc., however, the amount they are paid are based on several factors. These factors may include the total number of followers the influencer have, the amount of engagement their social media post garner from their followers, the number of social media posts and frequency of the social media posts, etc. Unfortunately, it can be difficult to obtain new followers and/or to retain existing followers because the followers may not be interested in the content created by the influencer. As a result, this may lead to difficulties being able to acquire new followers and existing followers may unsubscribe from the influencer's channel. Furthermore, since the revenue of the influencer can depend on the number of followers an influencer has and the amount of engagement the influencer's content garners, the revenue of the influencer can be adversely affected.

It is in this context that implementations of the disclosure arise.

SUMMARY

Implementations of the present disclosure include devices, methods and systems relating to selecting recommended content from a plurality of content channels that are identified as interesting or relevant to a follower's preference. In some embodiments, followers can connect to a channel of an influencer to view content created by the influencer or watched by an influencer. The influencer channel may include various types of content created by the influencer such as commentary regarding gameplay by others, commentary to sporting events, reaction videos, product reviews, product endorsements, comedy sketches, etc. In one example, the influencer may create content that shows the influencer watching a live E-sports event (via connecting to a content channel) and providing commentary on what is occurring during the event.

In one embodiment, the influencer may use an influencer interface to assist the influencer in deciding which content channel to switch to after or before the content in a present content channel comes to an end. In some embodiments, the influencer interface includes a plurality of predicted recommended content channels that may be of interest to the current followers of the influencer. In one embodiment, the influencer interface includes a predicted number of followers for a given recommended content channel, and an associated engagement metrics to assist the influencer with their decision making In one embodiment, an engagement model is used to predict the recommended content channel and to generate the engagement metrics. As a result, the influencer is provided with a dynamic experience that allows the influencer to efficiently navigate through different content channels to view content that is engaging to the influencer and would tend to increase or maintain follower engagement.

In one embodiment, a method for recommending content channels for an influencer disclosed. In this embodiment, the method includes identifying a session of the influencer. The session includes a current content channel being viewed by the influencer and made available for streaming to one or more followers of the influencer. The current content channel is one of a plurality of content channels made available for viewing by the influencer. The method includes accessing, during the session, content data from the plurality of content channels. The content data is associated with gameplay of one or more players engaged in gameplay. The method includes accessing profile data of the followers of the influencer. The profile data includes content preferences of said followers. The method includes predicting engagement metrics for said followers of the influencer in relation to said plurality of content channels. The engagement metrics being updated in substantial real time based on change occurring with the content data in plurality of content channels. The method includes generating an influencer interface for presenting said predicted engagement metrics. The engagement metrics are configured to provide indicators of when engagement metrics for the current content channel indicate a predicted decrease relative to a predicted increase when switching to a different content channel from among the plurality of content channels available during the session.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1A:
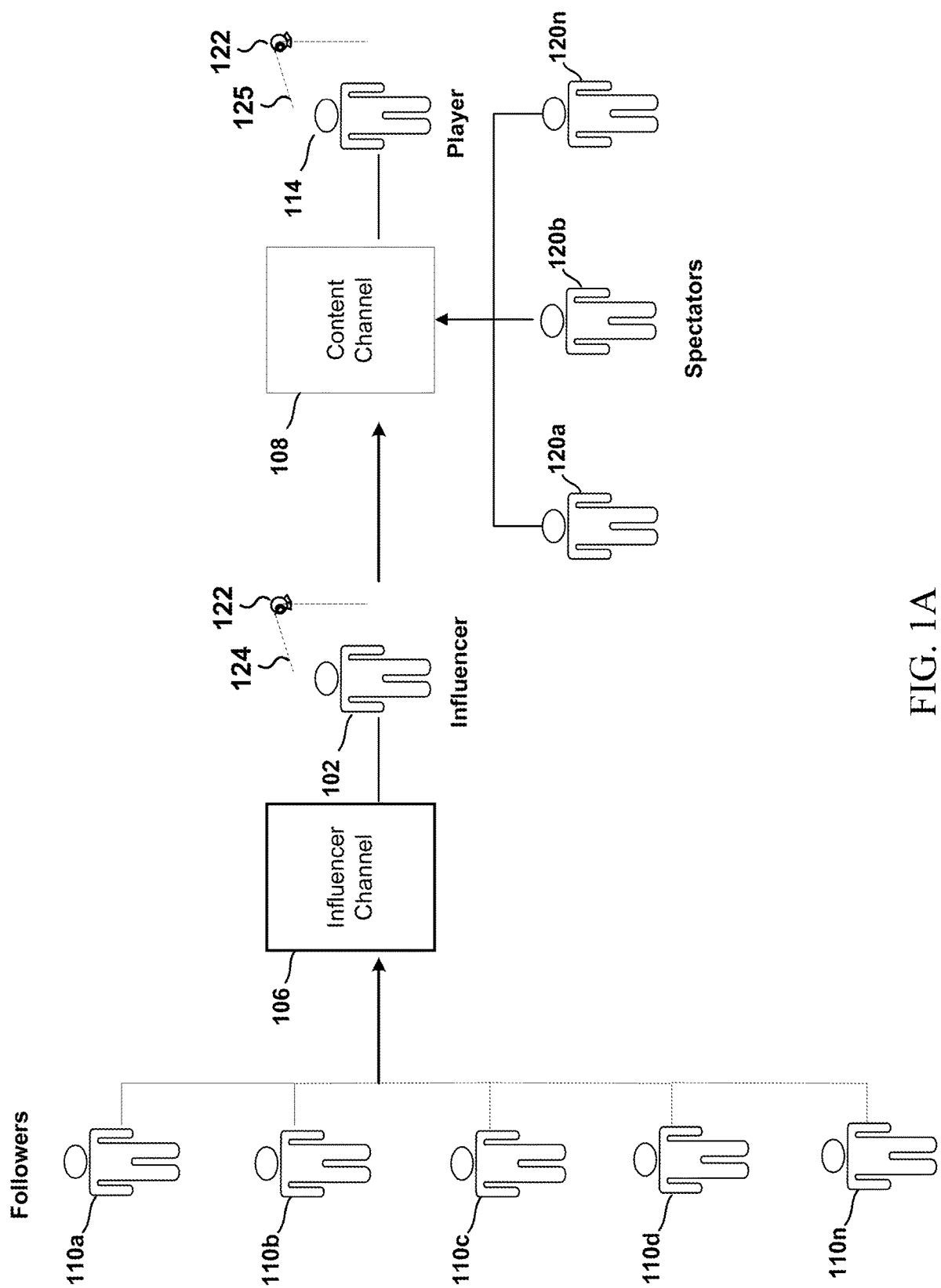
FIG. 1A is an embodiment illustrating an influencer and a plurality of spectators connected to a content channel of a player, and a plurality of followers connected an influencer channel, in accordance with an implementation of the disclosure.

The following implementations of the present disclosure provide devices, methods, and systems for selecting recommended content for an influencer interface. By way of example, the selection of recommended content is facilitated by processing content data and/or profile data of followers. In one embodiment a method is disclosed that enables selecting recommended content for an influencer interface. The recommended content is, in one embodiment, designed to maintain or increase follower engagement. In one example, the influencer interface provides information to the influencer regarding current engagement by his or her followers, and suggestions for other channels that may increase or maintain engagement by his or her followers. Using this information, influencers are able to selectively switch between content channels in a way that is predictively designed to increase or maintain a level of engagement by his or her followers. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a plurality of followers can connect to a channel of the influencer over a network to view content (e.g., video, audio, photos, etc.) created by or watched by the influencer. In one example, the influencer may publish a livestream session that allows followers to view his or her actions. These actions by the influencer may include a livestream of what the influencer is doing in his or her location, which may include a view/window into video game content that the influencer is watching. As the influencer is watching the video game session, the influencer may be commenting about the gameplay, which may be entertaining to viewers/followers of the influencer. For example, the influencer may gain followers because of the color commentating provided regarding gameplay of others, or may sometimes show followers new game moves or strategies. In some cases, the influencer may provide comments that are entertaining to his or her followers while watching and spectating gameplay of others.

In another example, the influencer may open a live showing of the influencer viewing a content channel of a player. The content channel of the player shows the player competing in a live gaming event (e.g., E-sports event, multiplayer game, or any live streaming game), and while the player is competing in the gaming event, the influencer may provide a play-by-play commentary of what is occurring in the live gaming event. Accordingly, when the followers are connected to view content on the influencer's channel, the followers may have a view or window into of the live gaming event, a view of the influencer watching the live gaming event, and an audio feed of the influencer's play-by-play commentary of the live gaming event. In other embodiments the content channel may include various type of content created by the player and/or other content creators. For example, the content available through the content channel may relate to gaming, sports, music, fashion, education, comedy, etc. In some embodiments, spectators can connect to the content channel of the player to view the player's content. Accordingly, in some embodiments, the influencer and the spectators can view the player's content by connecting directly to the content channel of the player (e.g., the players live stream), whereas the followers can view the player's content by viewing it through the channel of the influencer.

In accordance with another embodiment, an influencer interface can be used by the influencer to assist the influencer in deciding what content to view. For example, an influencer may be viewing a comedy show on a content channel. As the comedy show winds down or becomes less interesting, the influencer can use the influencer interface to decide what content the influencer show switch to so that followers will remain engaged. In one embodiment, influencer interface can function as an interface that provides the influencer with content channels to watch in a way that will maintain or increase engagement by followers of the influencer. When the influencer selects new content, the followers seamlessly transition to the next content channel. If the influencer has not switched channels, the followers may have become bored with the influencer's content and/or would have logged off from viewing the influencer.

In one embodiment, the influencer interface can be viewed on a display and/or a separate device such as a smart phone, a tablet, a monitor, a television, etc. In another embodiment, the influencer interface may be viewed via another window of the influencer's monitor. In one embodiment, the influencer interface can include a thumbnail image that provides a view into the content channel that the influencer is presently connected to (e.g., currently viewing). In some embodiments, the content channel that the influencer is presently connected to may include an engagement metrics menu that provides various metrics associated with the current followers that are connected to the influencer channel In one embodiment, the influencer interface can include one or more recommended content channels. The recommended content channels can include a thumbnail image that provides a preview into the recommended content channel to help the influencer quickly determine the type of content that is being recommended. In some embodiments, each recommended content channel can include a predicted engagement metrics menu that provides various metrics associated with the followers that are predicted to connect to the influencer channel when the influencer switches to a particular recommended content channel to watch.

In accordance with another embodiment, an engagement model can be configured to predict recommended content channels for inclusion into the influencer interface. In one embodiment, the engagement model is configured to receive various data as input such as content channel data, follower profile data, follower feedback, influencer channel data etc. The engagement model may process the noted inputs and the engagement model can be used to make inferences on the type of content that may be appealing or unappealing to followers. In some cases, the recommendation can provide metrics regarding how many new followers may join or how many followers may leave, if a new channel is selected. The recommendations, in some embodiment will take into account when certain democracies of followers will be logged in or available for viewing the influencer. In some embodiments, engagement metrics can be generated using the engagement model. The engagement metrics can include information related to the current followers and potential new followers, and provide predictions related to the viewing behavior of the plurality of followers. For example, the engagement metrics may include information such as the type of content the followers may be interested in viewing, and influencer actions that may cause the followers to disconnect or unsubscribe from the influencer's channel.

With the above overview in mind, the following provides several example figures to facilitate understanding of the example embodiments.

FIG. 1A is an embodiment illustrating an influencer 102 and a plurality of spectators 120 connected to a content channel 108 of a player 114, and a plurality of followers 110 connected an influencer channel 106. As shown, FIG. 1A illustrates a plurality of followers 110a-110n connected to the influencer channel 106 to view content of the influencer 102. In one embodiment, the content created by the influencer 102 provides a view into an environment of the influencer 102 that is captured by camera 122 which has a camera POV 124. For example, the influencer 102 may create content that includes a recording of the influence 102 candidly talking about a new PlayStation 4 video game that was recently released. The camera 122 is used to record the influencer 102 in the environment (e.g., bedroom) of the influencer while the influencer talks about the new video game. In another embodiment, the influencer 102 is connected to content channel 108 so that the influencer 102 can view content created by a player 114. In some embodiments, the content channel 108 includes a recording of the player 114 that is captured by camera 116 with a camera POV 125. In yet another embodiment, a plurality of spectators 120 are connected to the content channel 108 to view content created by the player 114.

In some embodiments, the plurality of followers 110 are connected to the influencer channel 106 to view content provided by the influencer 102. In one embodiment, the plurality of followers 110 are those who follow or subscribe to the influencer channel 106 because they are interested in the content that the influencer 102 creates or watches and makes available for streaming on the influencer channel 106. In one example, an influencer 102 may be a famous pop singer who has a large fan base. Each week, the famous pop singer watches content on the content channel 108 that includes amateur singers performing various musical acts. The followers 110 are notified that new content is available for viewing. In some embodiments, the influencer channel 106 may include content that is available for live-viewing or content that has been rebroadcasted and available for viewing at any desired time.

In some embodiments, the influencer 102 creates various content and makes it available for viewing on the influencer channel 106. The influencer 102 may be a person who has a substantial following on a video platform and/or social media platform (e.g., YouTube, Instagram, Twitter, Facebook, etc.) The influencer 102 can set trends and provide their followers 110 with their opinion on various services, products, brands, etc. to help companies market their services and products. In some embodiments the influencer 102 may be a professional gamer, a performing artist, a visual artist, an athlete, an industry expert, or person that is well respected and have specialized knowledge in the particular niche or industry. In some embodiments, the content created by the influencer 102 may be captured by the camera 122. For example, the influencer 102 may be a person well versed in the video game industry and is known for reviewing and providing commentary on horror video games. The camera 122 can be used to record the influencer 122 as the influencer creates content or watches content on the content channel. For example, the camera 122 can be used to record the influencer 102 watching a content channel 108 that includes a preview of a new horror video game has just been released. In some embodiments, the influencer 102 can make edits to the recorded video content to enhance the content (e.g., adding background music, sound effects, graphics, images, etc.) and/or customize it to make it more appealing to their followers 110. In one embodiment, the content created by the influencer 102 can be a video recording, an audio recording, various images, or any combination thereof.

In some embodiments, the influencer 102 can connect to the content channel 108 to view content created by the player 114. The content channel 108 of the player 114 may include various types of content created by the player 114 such as a video recording, an audio recording, images, or any combination thereof. In some embodiments, the camera 116 is used to record the player 114 performing various activities, e.g., playing a video game, endorsing a product, etc. The recorded video can be used as content and viewed on the content channel 108. In some embodiments, a plurality of spectators 120a-120n can connect to the content channel 108 to view content created by the player 114. As illustrated in FIG. 1A, in one embodiment, the influencer 102 and the spectators 120 can view the content of the player 114 by connecting directly to the content channel 108, whereas the followers 110 can view the player's content by connecting to the influencer channel 106.

Figure 1B:
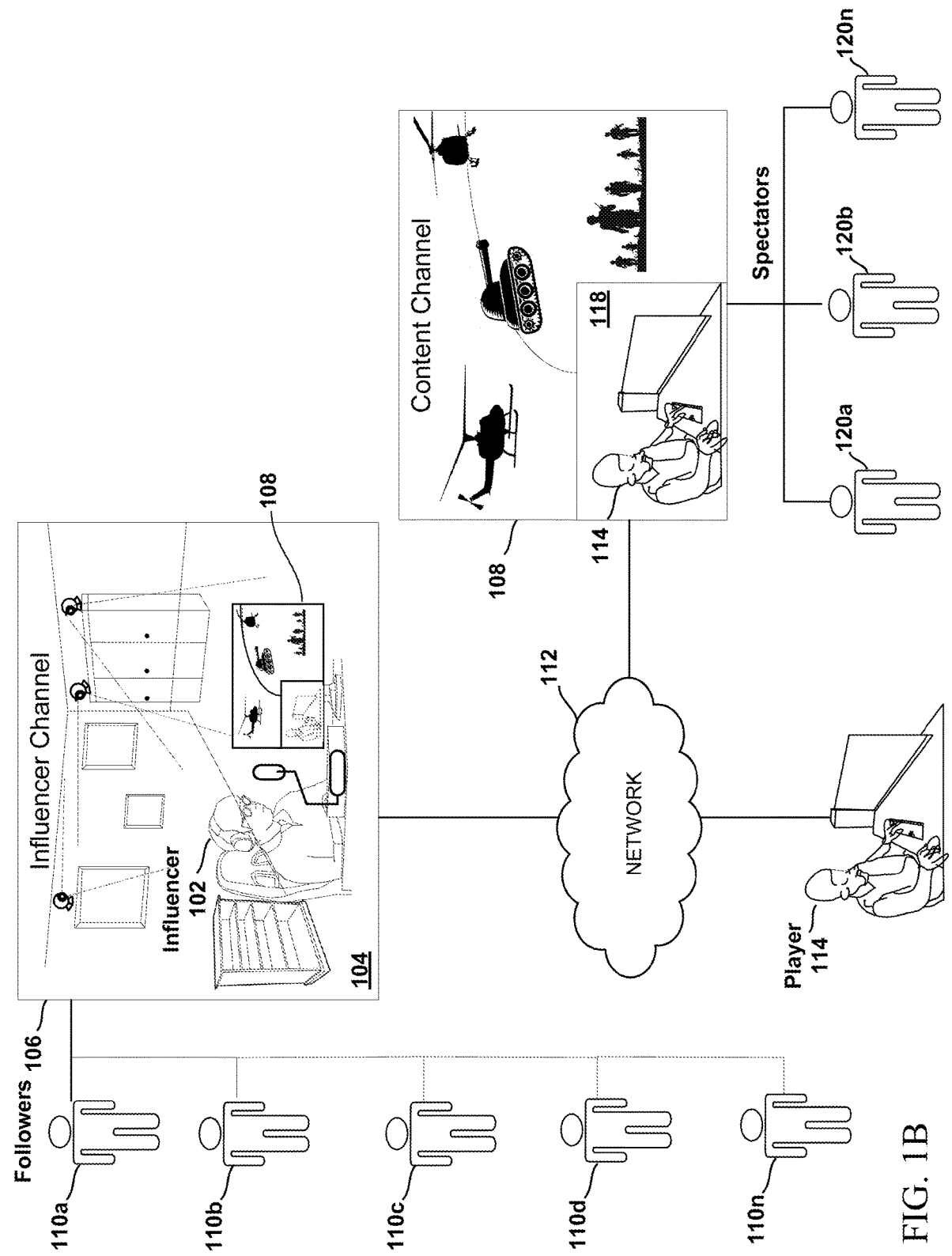
FIG. 1B is an embodiment illustrating a plurality of followers connected to an influencer channel to view a video recording of an influencer watching and commentating on a gameplay of a player, in accordance with an implementation of the disclosure.

FIG. 1B is an embodiment illustrating a plurality of followers 110a-110n connected to an influencer channel 106 to view a video recording of an influencer 102 watching and commentating on a gameplay of a player 114. As shown, the embodiment includes followers 110a-110n, influencer channel 106, player 114, content channel 108, spectators 120a-120n. In one embodiment, the followers 110a-110n are connected to the influencer channel 106 through a network 112 and can view content associated with the influencer 102 via the influencer channel 106. As noted above, the plurality of followers 110 may subscribe to the influencer channel 106 and view content that the influencer 102 releases and makes available through the influencer channel 106. In some embodiments, the followers 110 are connected to the influencer channel 106 because of their interest in the content that the influencer 102 creates or is watching, or because of their interest in the influencer's 102 personality because they find the influencer entraining. For example, the influencer 102 may be a comedian that has a likeable personality who many people find enjoyable to watch. If the comedian creates content related to a new action video game that was recently released, although some followers may not be interested in the new action video game, the followers may still stay connected to the influencer channel 106 because the followers find the influencer entertaining to watch.

In one embodiment, various content (e.g., video, audio, photos, etc.) created by the influencer 102 can be viewed on the influencer channel 106. In one example, the influencer channel 106 includes video content that is available for live-viewing and/or rebroadcasted and available for viewing at any desired time. The type of content created by the influencer 102 may depend on what the influencer 102 creates and shares with the followers 110. For example, the influencer 102 may create "reaction videos" which includes a recording of the influencer 102 watching content that they have never seen before. As shown in FIG. 1B, the influencer 102 is connected to the content channel 108 to view the content available through the content channel 108 of the player. As illustrated, the influencer 102 is shown watching the player 114 playing a video game. In some embodiments, various audiovisual equipment (e.g., microphone and cameras) located in the environment 104 of the influencer 102 are configured to record the influencer 102 while the influencer 102 watches the gameplay and reacts to what is occurring the gameplay.

In other embodiments, the spectators 120a-120n can connect to the content channel 108 over network 112 to view the content of the player 114. As illustrated in the FIG. 1B, the content channel 108 may include a recording of the player 114 playing a game involving soldiers in war battle. As noted above, the influencer 102 and the spectators 120 can both connect directly to the content channel 108 to view the gameplay of the player 114. However, in some embodiments, the followers 110 can view the gameplay of the player 114 by connecting and viewing it through the influencer channel 106.

Figure 2:
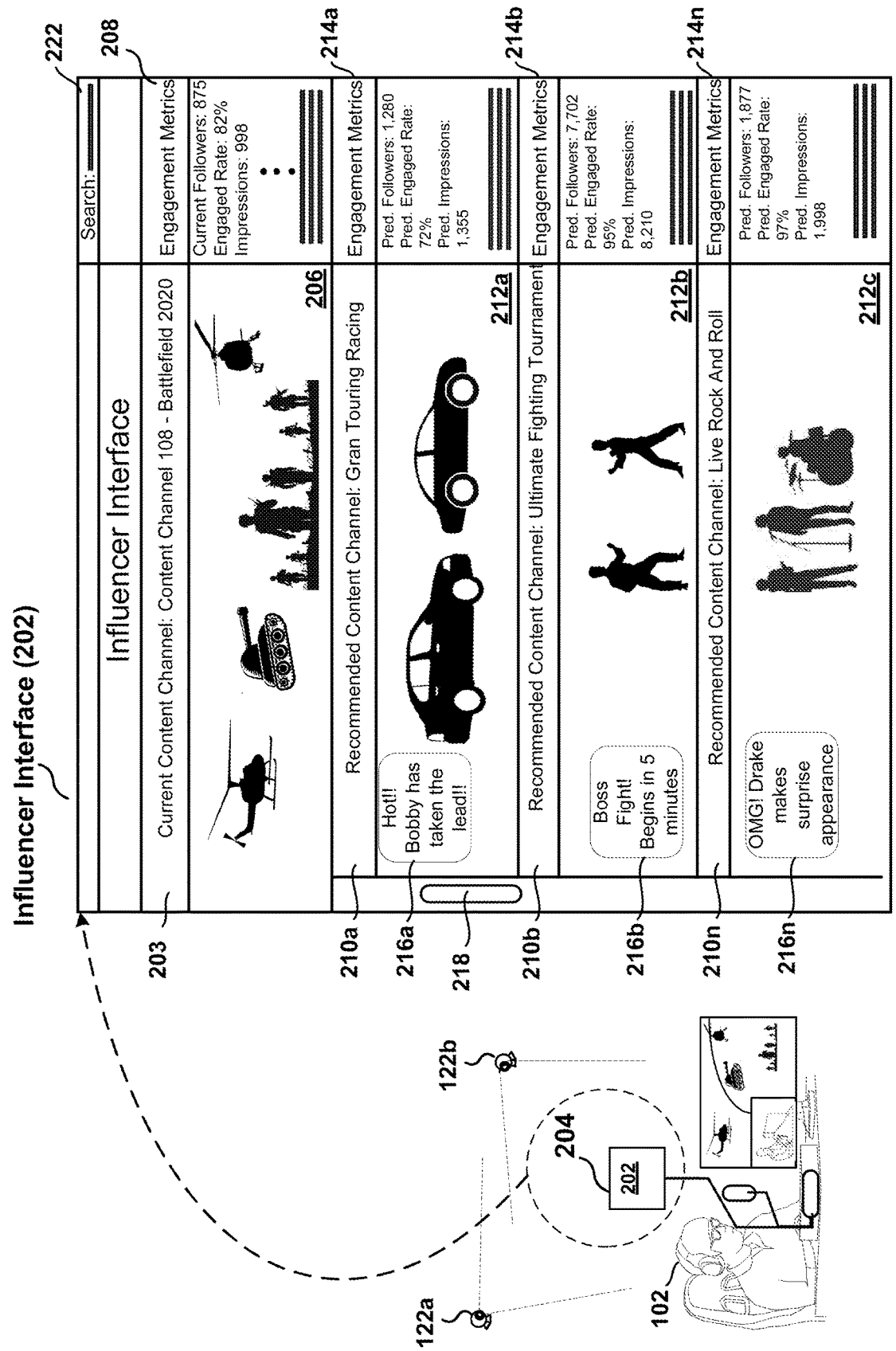
FIG. 2 illustrates an embodiment of an influencer viewing a content channel while using an influencer interface to assist the influencer in deciding which other content channels to view, in accordance with an implementation of the disclosure.

FIG. 2 illustrates an embodiment of an influencer 102 viewing a content channel 108 while using an influencer interface 202 to assist the influencer 102 in deciding which other content channels to view. For example, as illustrated, the influencer 102 is connected to content channel 108 and is watching a player 114 competing in an E-sports competition. In one embodiment, while viewing the E-sports competition, the influencer 102 may use the cameras 122a-122b and the microphone to record the influencer reacting to the E-sports competition which can be used as content for the influencer channel 106. Accordingly, when the followers 110 connect to the influencer channel 106, the followers 110 will have a view of the influencer 102 watching the gameplay and can listen to the influencer's reaction to the gameplay.

In one embodiment, the influencer interface 202 can be viewed on a device 204 and/or a separate device such as a smart phone, a tablet, a monitor, a television, etc. The influencer interface 202 may include various tools that can assist the influencer 102 curate a vast amount of content to make the content selection process more efficient in order to increase or maintain engagement by his or her followers. For example, when content on a current content channel comes to an end, the influencer interface 202 can assist the influencer 102 with the selection of other content channels so that the transition to other content channel is seamless with minimal delays, and the selected channel is engaging to the followers.

In some embodiments, as illustrated in FIG. 2, the influencer interface 202 includes a current content channel menu 203 and recommended content channel menus 210a-210n. The current content channel menu 203 corresponds to the content channel the influencer 102 is currently connecting to and watching. For example, as shown in FIG. 2, the current content channel menu 203 indicates that the influencer 102 is currently viewing a video game, "Battlefield 2020." In one embodiment, the current content channel menu 203 may include a content preview 206 that includes an image from a scene in the content.

In some embodiments, the current content channel menu 203 may include an engagement metrics menu 208. The engagement metrics menu 208 may include various metrics associated with the followers 110 that are currently connected to the influencer channel 106. For example, the engagement metrics menu 208 may include information such as the total number of impressions (e.g., total views), total number of current followers, engagement rate (e.g., likes, comments, sharing, etc.), sentiment score, etc. The engagement metrics menu 208 can be used by the influencer 102 to determine whether the content currently viewed by the influencer 102 is being perceived positively or negatively by the followers 110. If the data indicates that the current content is being perceived positively (e.g., large number of current followers, high engagement rate), the influencer 102 may stay connected to the current content channel Conversely, if the current content is being perceived negatively, the influencer 102 may consider switching to a different content channel to increase the number of followers.

In another embodiment, the influencer interface 202 may include one or more recommended content channel menus 210a-210n with a corresponding recommended content that the influencer 102 can select to watch. In one embodiment, the influencer 102 may use a scrollbar 218 to scroll in the desired direction (e.g., up or down) to view a desired recommended content channel menu 210 that is temporarily hidden from the influencer's view. As illustrated in FIG. 2, each recommended content channel menu 210a-210n may include a corresponding recommended content (e.g., Gran Touring Racing, Ultimate Fighting Tournament, Live Rock and Roll, respectively), a content preview (e.g., 212a-212n, respectively), a headline (e.g., 216a-216n, respectively), and a predicted engagement metrics menu (e.g., 214a-216n, respectively). In one embodiment, the content preview (e.g., 212a-212n) includes a thumbnail image from a scene of the corresponding recommended content so that the influencer 102 can visually understand the context of the recommended content. In another embodiment, each recommended content includes a headline 216 that highlights what is presently occurring or will occur in the corresponding content. In some embodiments, the order of the recommended content channel may be arranged in order based on the total number of predicted followers, predicted engagement rate, etc.

In some embodiments, for each recommended content channel, the predicted engagement metrics menu (e.g., 214a-214n) may include various predicted metrics corresponding to how the followers are predicted to respond to a particular recommended content channel. The predicted engagement metrics menu (e.g., 214a-214n) may include various metrics such as a predicted total number of followers, a predicted engagement rate, a predicted sentiment score, a predicted number of impressions, a predicted retention score, topics that are acceptable to talk about, topics that may be offensive to the followers etc. Using the noted information provided in the predicted engagement metrics menu, the influencer 102 can quickly determine what content the followers 110 are predicted to have the most interest in and whether the influencer should switch to a particular recommended content channel in order to obtain more followers. Accordingly, the selection process and transition to other content channels can be seamless and efficient for the influencer 102.

In some embodiments, the engagement metrics may include a prediction of the total number of followers that are expected to connect to the influencer channel 106 when the influencer 102 selects a particular content to view. In some embodiments, the predicted number of followers may include the followers who were already connected to the influencer channel 106 and additional followers who may also connect to the influencer channel 106 because of their interest in the content that the influencer 102 may view.

In another embodiment, the engagement metrics may include a predicted engagement rate for a particular content channel. The predicted engagement rate may indicate the total number of times viewers have interacted with a particular content 604. The engagement rate may take into consideration various factors such as the number of shares, likes, comments, emojis used, etc. that is associated with the particular content. In one embodiment, the engagement metrics may include a predicted sentiment score for a particular content channel. The predicted sentiment score may provide information regarding how a viewer emotionally feels about the particular content. For example, a high sentiment score may indicate a positive emotion whereas a low sentiment score may indicate a negative emotion.

In some embodiments, the engagement metrics may include a predicted retention score for a particular content channel. The retention score may provide information regarding how likely or unlikely it is to retain the followers 110 once the influencer 102 connects to a content channel to view a particular content. For example, the geolocation data of the followers may indicate that the 75% of the followers 110 of the influencer 102 are connecting from Japan. Content that is generally popular (e.g., baseball) among the Japanese public can be assigned a higher predicted retention score than content that is unpopular (e.g., Ice hockey) among the Japanese public.

In one embodiment, the engagement metrics may include a prediction of the number of impressions for a particular content channel. The number of impressions may indicate the total number of times all viewers (e.g., influencers, spectators, followers, etc.) are predicted to view the particular content. The predicted number of impressions may indicate how popular a particular content is.

In some embodiments, the engagement metrics may provide the influencer 102 with information on how to navigate through various topics of discussion while the influencer 102 is watching a particular content via the content channel. For example, engagement metrics may include a list of topics that are acceptable and/or unacceptable to talk about. In some cultures and demographics, it may be offensive to talk about money, politics, religion, etc. whereas in others, this may be acceptable. Accordingly, the engagement metrics may provide the influencer 102 with an acceptable list of topics to talk about to help retain the existing followers and/or to acquire new followers. In some embodiments, the engagement metrics may predict the number of followers that may disconnect from the influencer channel 106 when a particular topic is discussed.

In another embodiment, the engagement metrics may include information related to why some followers 110 may have unsubscribed or are no longer interested in viewing content on the influencer channel 106. For example, followers 110 are connected to the influencer channel 106 to watch the influencer's 102 content that shows the influencer 102 watching the gameplay of a player playing the video game, "Fortnite." When the influencer 102 switches to a different content channel that includes the video game, "NHL 20 Hokey," 40% of the followers disconnects from the influencer channel 106. According, based on the gaming history of the follower and profile of the follower, the engagement metrics may include information that explains that 40% of the followers disconnected from the influencer channel 106 because the followers were primarily interested video game "Fortnite" and they do not like hockey games.

To illustrate some of the noted features of the influencer interface 202, as shown in FIG. 2, the influencer interface 202 includes recommended content channel menus 210a-210n. The recommended content channel menu 210a includes the recommended content, e.g., "Gran Touring Racing." As illustrated, the headline 216a indicates "Hot!! Bobby has taken the lead! !" and the content preview 212a depicts an image of Bobby taking the lead in the car race. The predicted engagement metrics menu 214a indicates the predicted total number of followers and the predicted engagement rate, e.g., 1,280 followers and 72%, respectively. The recommended content channel menu 210b includes the recommended content, e.g., "Ultimate Fighting Tournament." As illustrated, the headline 216b indicates "Boss Fight! Begins in 5 minutes" and the content preview 212b depicts an image of two fighters that are in position to begin fighting. The predicted engagement metrics menu 214b indicates the predicted total number of followers and the predicted engagement rate, e.g., 7,702 followers and 95%, respectively.

FIG. 2 further illustrates the recommended content channel menu 210n which includes the recommended content, e.g., "Live Rock and Roll". As illustrated, the headline 216n indicates "OMG! Drake makes surprise appearance" and the content preview 212n depicts in image of the musician, "Drake," making a surprise appearance at the Live Rock and Roll concert. The predicted engagement metrics menu 214n indicates the predicted total number of followers and the predicted engagement rate, e.g., 1,877 followers and 97%, respectively.

Accordingly, the influencer interface 202 allows the influencer 102 to be informed of key moments and events that the followers 110 may have an interest in viewing. The influencer's 102 decision to select a particular recommended content channel 210 to watch and use to create content for the influencer channel may be based on the influencer's interest in the particular content, the follower's interest in the particular content, or any combination thereof. For example, although the content in the recommended content channel menu 210n (e.g., Live Rock and Roll) has a fewer number of predicted followers than the content in the recommended content channel menu 210b (e.g., Ultimate Fighting Tournament), the influencer 102 may select the Live Rock and Roll concert to view because the influencer 102 does not enjoy watching violent scenes.

Figure 3:
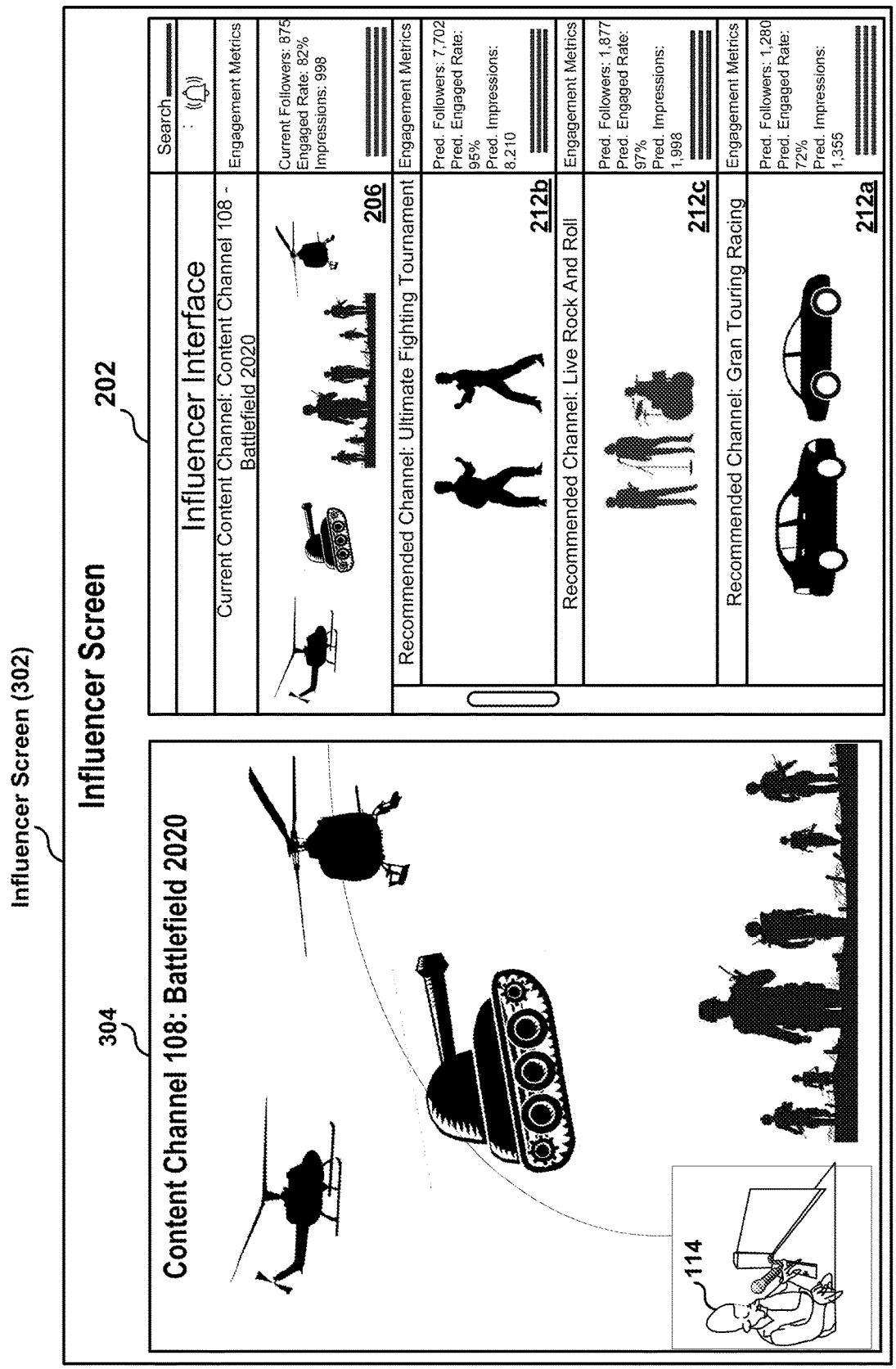
FIG. 3 illustrates an embodiment of an influencer screen which provides a view from the perspective of an influencer, in accordance with an implementation of the disclosure.

FIG. 3 illustrates an embodiment of an influencer screen 302 which provides a view from the perspective of the influencer 102. When the influencer 102 is connected to view content on the content channel 108, the influencer screen e 302 may include a view of the content that the influencer is currently watching (e.g., Battlefield 2020). In some embodiments, the influencer screen 302 may also include a view of the influencer interface 202 so that the influencer can seamlessly determine which content channel to view next. Instead of using a separate device, a single device may be used by the influencer 102 to view the content channel 108 and the influencer interface 202. In some embodiments, the order of the recommended content channel may be arranged in order based on the total number of predicted followers. For example, as illustrated in FIG. 3, the recommended content channel is arranged in order based on the total number of predicted followers (e.g., Ultimate Fighting Tournament, Live Rock and Roll, Gran Touring Racing).

Figure 4:
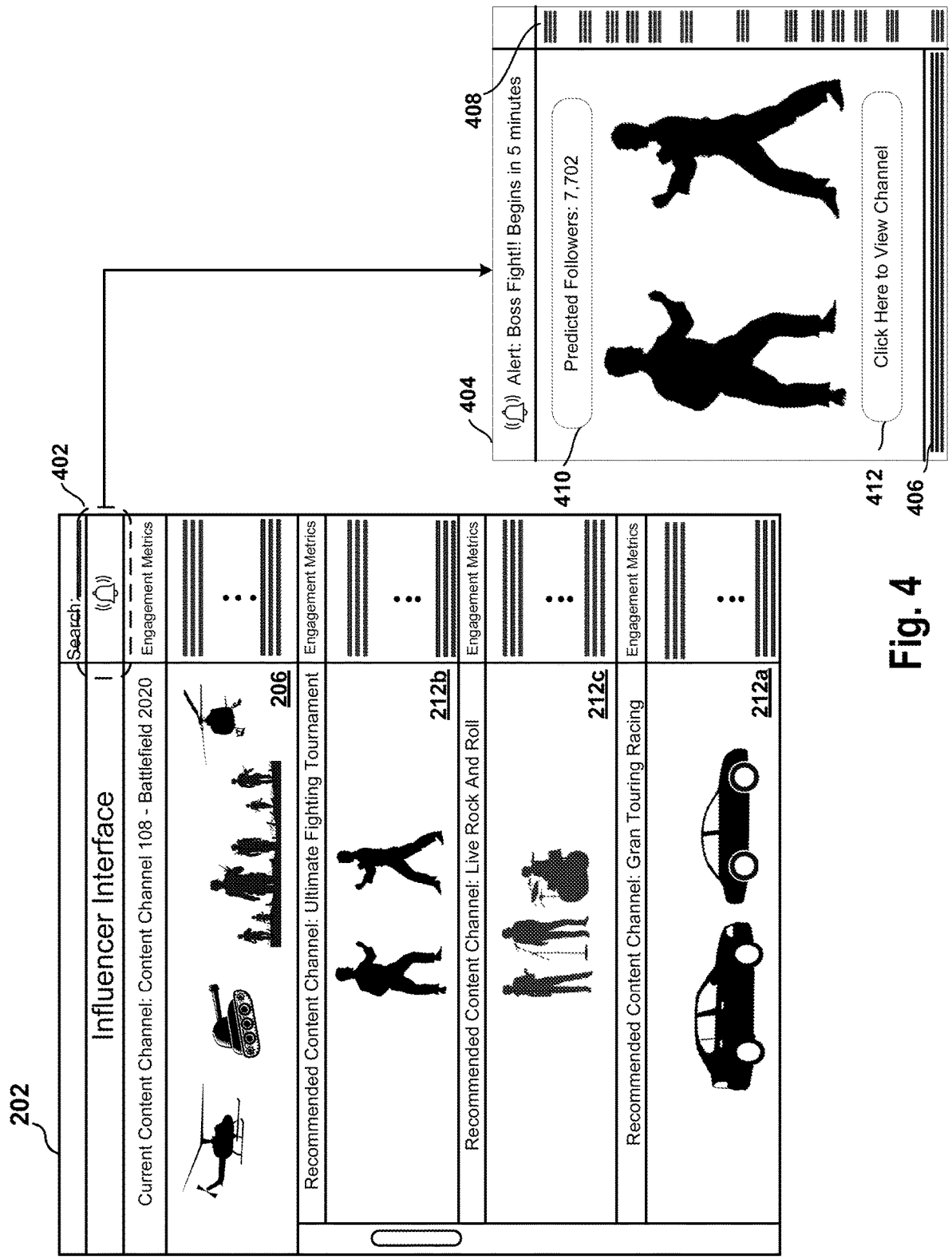
FIG. 4 illustrates an embodiment of an alert notification that appears on the influencer interface to inform the influencer that an important event is going to occur, in accordance with an implementation of the disclosure.

FIG. 4 illustrates an embodiment of an alert notification 402 that appears on the influencer interface 202 to inform the influencer 102 that an important event is going to occur. In some embodiments, if the influencer 102 is not presently using or viewing the influencer interface 202, the influencer 102 can be informed via a text message on a cellular device, email, phone call, etc. For example, while the influencer 102 is eating dinner, the influencer 102 receives a text message on their cellular phone indicating that an important event is occurring in the next 30 minutes. The text message can recommend the influencer 102 to connect to the content channel because the followers 110 have a strong interest in watching the influencer's commentary on the event. The text message may also include the total number of predicted followers and various data associated with the predicted followers. Accordingly, the alert notification will notify the influencer 102 of various key events (e.g., breaking news, trending events, etc.) to prevent the influencer from inadvertently missing the key events.

In one embodiment, as shown on FIG. 4, the alert notification 402 (e.g., alarm bell) can flash and appear on the influencer interface 202. In some embodiments, the influencer can use a pointer on their device to scroll over the alert notification 402 to find out more information about the event. In one embodiment, a pop-up screen 404 appears which provides a preview of the content and various information about the content. As shown in FIG. 4, in one embodiment, the pop-up screen 404 may include a commentary section 406, a group chat section 408, a total number of predicted followers 410, and an icon 412 that allows the influencer 102 to click on in order to view the content channel.

Figure 5:
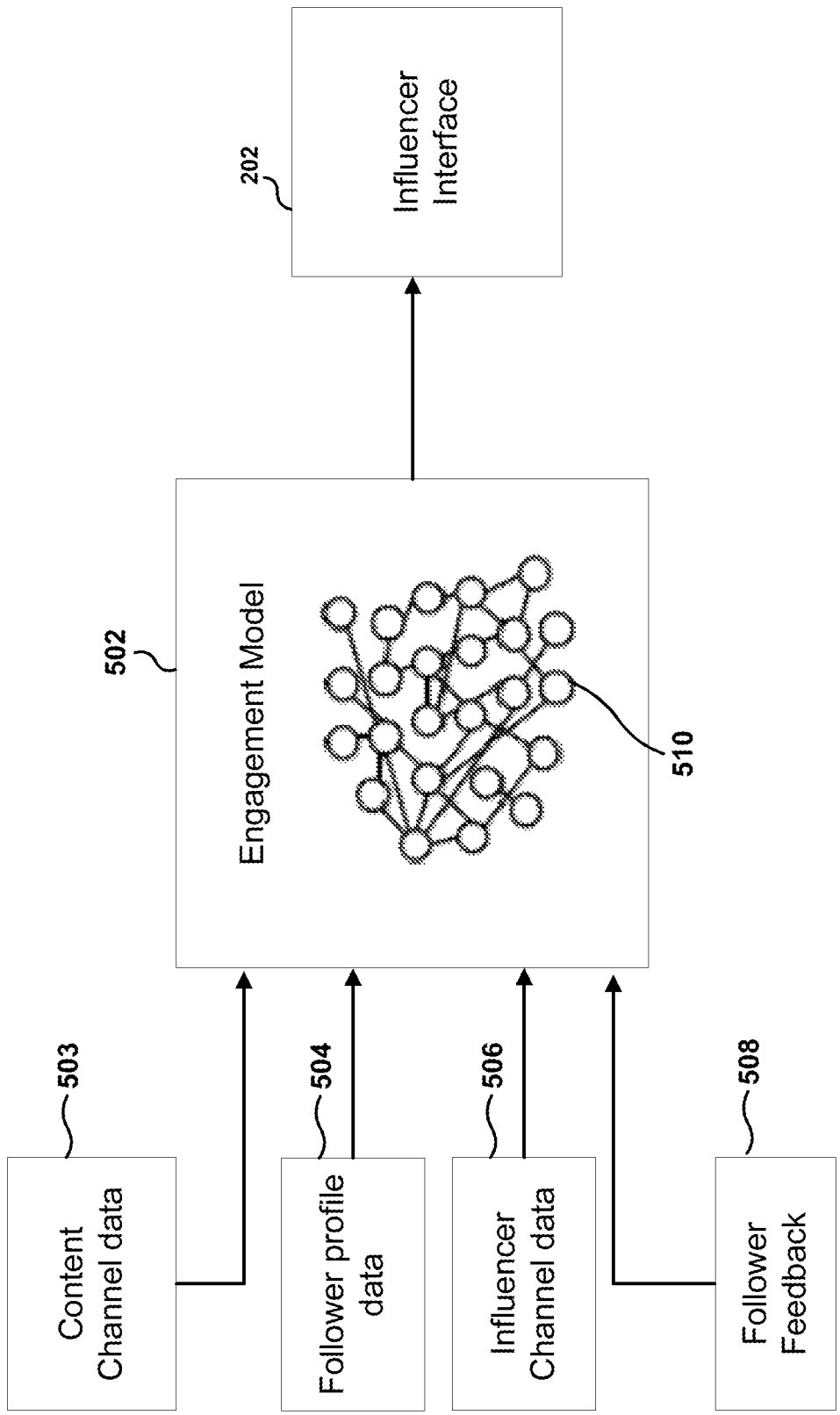
FIG. 5 illustrates an embodiment of a method for selecting recommended content channels for inclusion into the influencer interface using an engagement model, and additionally, content channel data, follower profile data, influencer channel data, and follower feedback as inputs, in accordance with an implementation of the disclosure.

FIG. 5 illustrates an embodiment of a method for selecting recommended content channels for inclusion into the influencer interface 202 using an engagement model 502, and additionally, content channel data 503, follower profile data 504, influencer channel data 506, and follower feedback 708 as inputs. In one embodiment, the engagement model 502 implements one or more machine learning operations that ingest follower content channel selections and non-selections, follower feedback comments, and follower comments amongst other followers, etc. In one example, the method includes accessing the content channel data 503 from a plurality of content channels. As noted above, the content channel may be associated with a player 114 and/or other content creators. The content may include various type of content related to gaming, sports, music, fashion, education, comedy, etc. The content channel data 503 may be include a variety of information associated with the content being shared via the content channel such as the type of content being displayed, scenes occurring in the content, actions performed by the characters, interactions between the characters, etc. In one embodiment, a machine learning model 510 is configured to process the content channel data 503, which can be parsed to identify specific features that relate to the actions and feedback of the follower.

In another embodiment, the method may further include accessing the follower profile data 504. The follower profile data 504 may include various follower attributes and characteristics such as the follower's age, gender, nationality, residence, preferences, interests, dislikes, gaming experience, gaming history, content viewing history, gaming skill level, etc. In some embodiments, the follower profile data 504 can be augmented with data obtained from the follower's social media accounts (e.g., Facebook, Twitter, Twitch, Instagram, etc.) using an API provided by the social media site. In some embodiments, the social media activity of the follower 110 can assist in further understanding the preferences, interests, disinterests, etc. of the follower. Accordingly, with an understanding of what the follower 110 is interested in, the selected recommended content channels for inclusion into the influencer interface 202 can be consistent with the interests of the followers 110. For example, the follower's Instagram page may indicate that the follower 110 primarily interacts and comments on Instagram postings related to Major League Baseball (MLB). This information may be parsed and analyzed for incorporation into the follower profile.

In another embodiment, the method may further include accessing the influencer channel data 506. In some embodiments, the influencer channel data 506 may include various data associated with the content created by the influencer 102. As noted above, the influencer 102 may create various content such as commentary to sporting events, reaction videos, product reviews, product endorsements, comedy sketches, etc. In one embodiment, the influencer channel data 506 may include various data associated with the influencer's content such as words expressed, behaviors, habits, tendencies, etc. of the influencer 102. This information may be parsed and analyzed and used to determine whether any of the noted attributes of the influencer 102 correlates to whether a follower 110 continues to stay engaged with the content in the influencer content channer 106, or whether the follower 110 decides to disconnect from the influencer content channer 106. For example, the influencer channel data 506 may indicate that the influencer 102 tends to use a lot of profanity language in in the influencer's reaction video. A machine learning model 510 may make an inference, based on the follower profile data 504 and influencer channel data 506, that 20% of the influencer's followers tend to disconnect from the influencer channel 106 when the content of the influencer includes the use of profanity language.

In another embodiment, the method may further include accessing the follower feedback 508. The follower feedback 508 may further help capture additional characteristics of the follower 110 since the feedback is provided directly from the follower 110. Accordingly, the follower feedback 508 may help improve the accuracy of the selected recommended content channel for inclusion into the influencer interface 202. In some embodiments, the machine learning model of the engagement model 502 may use the follower feedback 508 to identify specific features that can be used to predict the follower's desires to watch specific types of content. In one example, while viewing content on the influencer's channel, the follower 110 may insert a comment into a chat section within an interface of the follower requesting the influencer 102 to switch to the content channel that is showing the "Ultimate Fighting Tournament." This type of feedback feeds back to a machine learning model 510 to reinforce the system's understanding of the user's likes and dislikes. In this example, the system may take into consideration the context of the statement by the follower and infer that follower likes to watch fighting tournaments. Accordingly, the follower feedback 508 may be taking into consideration when selecting recommended content channels for inclusion into the influencer interface 202.

In some embodiments, the method then flows to engagement model 502 which is configured to receive as inputs the content channel data 503, the follower profile data 504, the influencer channel data 506, and the follower feedback 508. In another embodiment, other inputs that are not direct inputs or lack of input/feedback, may also be taken as inputs to the engagement model 502. The engagement model 502 may use a machine learning model 510 that is used to predict the recommended content channels and a corresponding predicted engagement metrics for each recommended content channel to help the influencer 102 decide which content channel to view. The engagement model 502 may also identify patterns and similarities based on the noted inputs. Using the patterns and similarities, the engagement model e 502 may infer what type of content the followers are interested in, and predict the recommended content channels that the followers may have an interest in viewing.

In another embodiment, the engagement model 502 may process the above noted inputs to identify features associated with the context of the content in the content channels, the characteristics of the follower, the follower feedback, etc. in order to classify the features, using one or more classifiers. The classified features are then used by the machine learning model 510 to predict various recommended content channels that the followers may be interested in viewing, and the total number of followers that are predicted to view each recommended content channel. As noted above, the recommended content channels may include a various type of content related to gaming, sports, music, fashion, education, comedy, etc.

In some embodiments, the method then flows to the influencer interface 202 where the output of engagement model 502 can be information used for rendering the recommended content channels that can be included into the influencer interface 202. In another embodiment, the engagement model 502 may include information that is used for rendering and the associated predicted engagement metrics for each recommended content channel.

Figure 6:
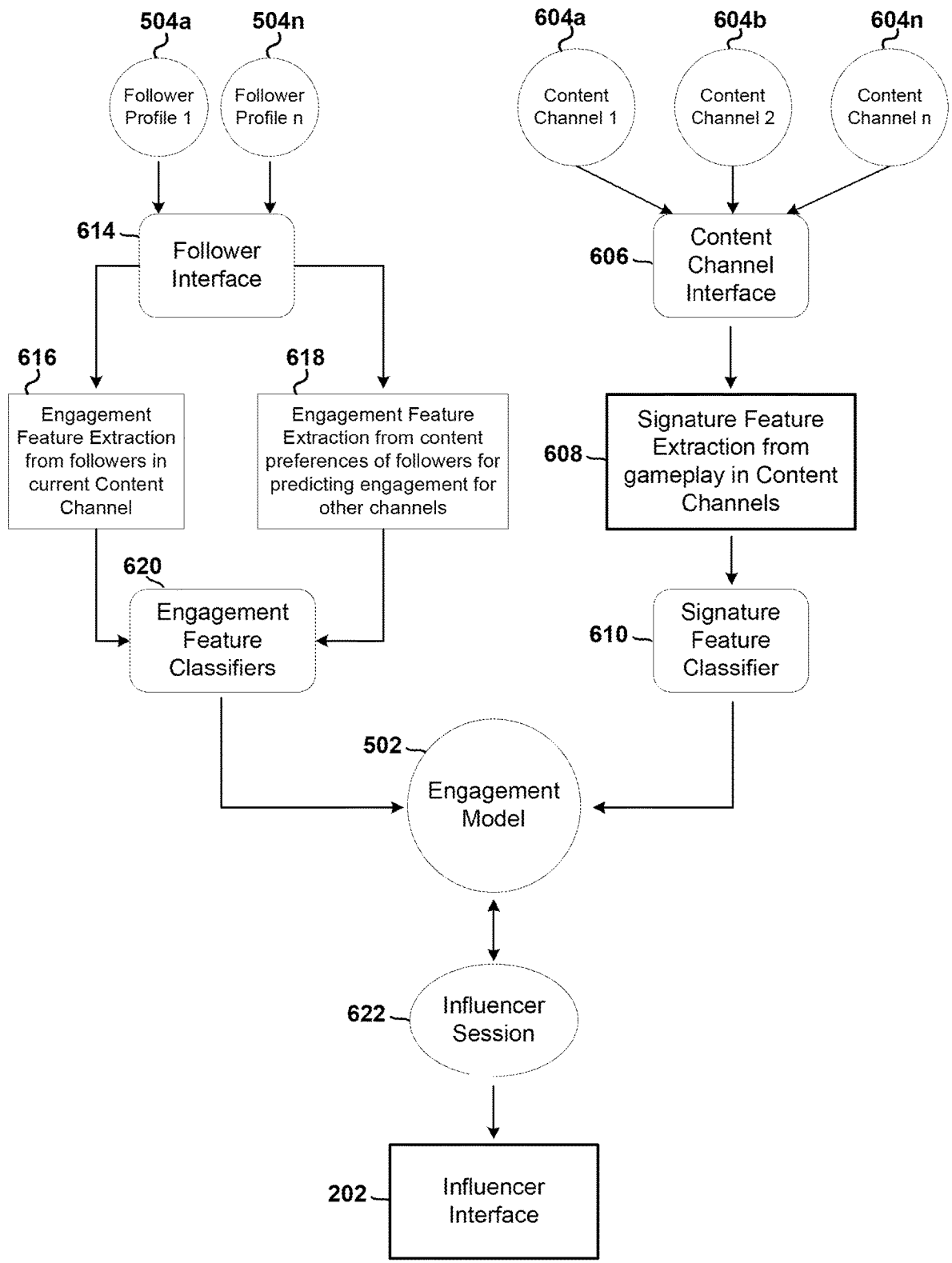
FIG. 6 illustrates an embodiment of a method for recommending content channels for an influencer for inclusion into an influencer interface, in accordance with an implementation of the disclosure.

FIG. 6 illustrates an embodiment of a method for recommending content channels for an influencer for inclusion into an influencer interface 202. In one embodiment, the method includes content channel interface 606 that is configured to receive and organize the data (e.g., game state data, telemetry data, etc.) from content channels 604a-604n. In some embodiments, the content channels 604a-604n may include various types of content and include content related to gaming, sports, music, fashion, education, comedy, etc. For example, content channel 604a may include content of a gameplay of a player competing in a live E-sports event and content 604b be may include content of a live music concert.

The method flows to operation 608 where the operation is configured to extract signature features from the gameplay and other content in the content channels. In some embodiments, signature features may include various information associated with the context of the content channel that identifies what is occurring in the content channel, e.g., game genre, player scores, specific scene, progression of the game, etc. In some embodiments, operation 608 can extract the signature features continuously in real-time as the content is streaming live so that the recommended content channels can be provided to the influencer in real-time to avoid missing out on key events that may occur.

In some embodiments, operation 608 can be configured to analyze the content in the content channel interface 606 to determine what content each content channel is associated with and the details of each scene within the content. For example, in addition to determining that content 604b is a live music event, the operation 608 can extract and determine the name of all the performers in the music event, the location of the music event, the producers associated with the music event, etc.

The method flows to operation 610 where the operation is configured to classify the signature features that are extracted from the content channels. Operation 610 can classify the signature features using one or more classifiers to accurately determine what is occurring in the content channels. In some embodiments, the classified signature features can be used by an engagement model 502 to generate recommended content channels which can be provided to the influencer 102 in real-time.

As further illustrated in FIG. 6, follower interface 614 is configured to receive profile data of the followers (e.g., 504a-504n). As noted above, the follower profile data 504 may include various follower attributes and characteristics such as the follower's age, gender, nationality, residence, content preferences, interests, dislikes, gaming experience, gaming history, content viewing history, gaming skill level, etc.

In one embodiment, the method flows from the follower interface 614 to operation 616 where the operation is configured to extract engagement features from the profile of the followers that are currently connected to view content on the influencer channel 106. In another embodiment, the method flows from the follower interface 614 to operation 618 where the operation is configured to extract engagement features from the profile of other followers (e.g., followers who are not currently connected to influencer channel) for predicting engagement for other content channels. Using engagement features extracted by operation 616 and operation 618, the method flows to operation 620 where the operation is configured to classify the engagement features that are extracted from the profiles associated with the plurality of followers. In some embodiments, operation 620 can classify the engagement features using one or more classifiers which can be used by the engagement model 502 to generate recommended content channels for the influencer 102.

In some embodiments, the engagement model 502 is configured to receive as inputs the classified signature features and the classified engagement features from operations 610 and 620, respectively. The engagement model 502 can use the classified features to identify patterns, similarities, and relationships between the noted inputs. The engagement model 502 is built over time, and as it receives more datasets its accuracy improves.

In some embodiments, the engagement model 502 can receive follower history data as an input. This may include historical data that indicates the follower's viewing history, purchase history, gaming history, or any other actions performed by the followers that may reveal their interests or disinterest in a particular type of content. For example, the follower history data may indicate that the follower 110 only purchases Sony PlayStation 4 video games that are related to sports (e.g., Madden NFL, NHL, MLB The Show, etc.). Accordingly, it can be inferred that the follower enjoys sports related video games and the data can be used by the engagement model 502 to identify patterns, similarities, and relationships between the various inputs.

In another embodiment, the engagement model 502 can receive geolocation data of a follower as an input. The geolocation data of a follower may include information that provides the location where the followers 110 are viewing the content from. For example, the geolocation data may indicate that the followers 75% of the followers that are connected to the influencer channel are viewing the session of the influencer from Japan. Accordingly, this information can be used recommended content channels that may be of particular interest to Japanese viewers.

Based on the processing by the engagement model 502, predictions can be made regarding how many followers will either continue to follow the influencer during a session or a prediction that a decrease in followers will occur relative to a predicted increase when switching to a different content channel. For example, based on processing all of the inputs by the engagement model 502, processing can infer that more or less followers will follow the influencer if the influencer changes to a different content channel at a given time during a session. In some embodiments, the prediction using the engagement model 502 can also provide information regarding predicted engagement metrics for other channels. These insights are particularly useful, as this provide a real-time and changing guide to the influence on what to do next. Should the influencer stay on the current channel? Should the influencer select another channel? What channel should the influencer select? When should the channel change be done? How long should the influence stay commenting/spectating a given content channel? Should the channel return to the last watched channel and when?

These are just some of the questions that influencers have, as wrong decisions can cause decreases in followers. In accordance with one or more of the disclosed embodiments, the influencer interface 202 is configured to provide predicted statistics to the influencer as to how his or her followers are predicted to behave. For instance, the influencer may know his or her current follower numbers and/or engagement at a given time during a session. Using the influencer interface 202, the influencer can be provided with predictions as to whether more or less followers will follow or continue to follow if a new content channel is selected. These insights are powerful for the influencer, as the influencer has limited personal time and spending time on content channels that increase followers and/or follower engagement is important.

As further illustrated in FIG. 6, during a session of the influencer, operation 622 is configured to query the engagement model 502 and request an updated recommended content channels and a corresponding engagement metrics. Operation 622 is configured to query the engagement model 502 continuously in real-time so that the influencer interface 202 includes an updated listing of recommended content channels and its associated engagement metrics.

Figure 7:
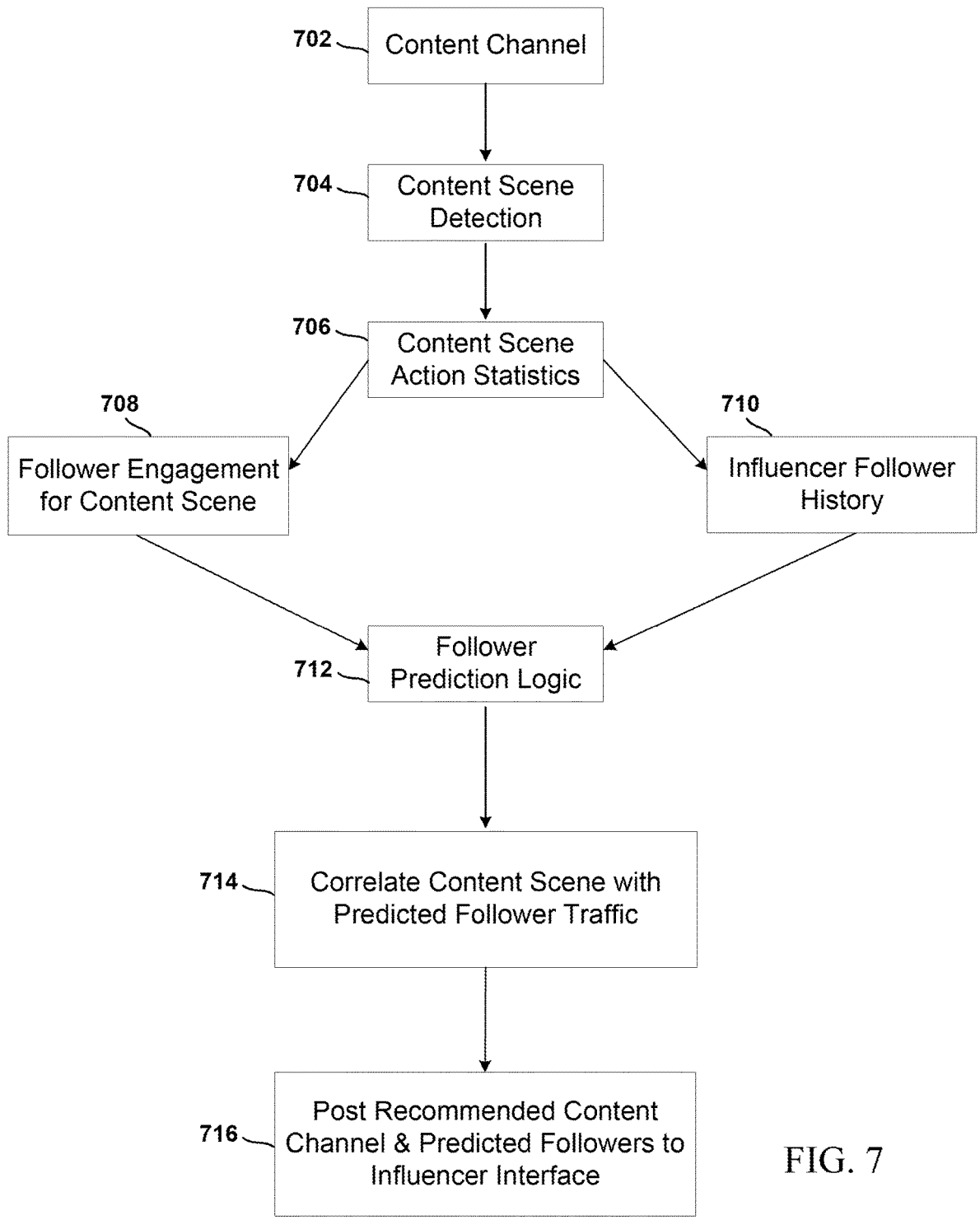
FIG. 7 shows an overall flow of an embodiment of a method for selecting recommended content that is consistent with the interests of the followers for inclusion into the influencer interface, in accordance with an implementation of the disclosure.

FIG. 7 shows an overall flow of an embodiment of a method for selecting recommended content channel that is consistent with the interests of the followers 110 for inclusion into the influencer interface 202. According to the shown embodiment, the method includes an operation 702 is configured identify content that is available for viewing in various content channels. Operation 702 can be configured to determine the context of the content, and to categorize them into various content categories (e.g., gaming, sports, music, fashion, education, comedy, etc.). Operation 704 is configured to analyze the content and determine what is occurring in the scenes of the content. In some embodiments, operation 704 can detect crucial events that will be occurring in a particular content channel. For example, operation 704 may analyze a content that includes a gameplay of a player playing a fighting game. Operation 704 can determine the progression of the gameplay and predict that the player will be fighting the "Boss Character" in the next five minutes.

The method flows to operation 706 where the operation may be configured to determine actions statistics for various scenes in the content. For example, in the gameplay of a player playing a fighting game, operation 706 can provide various statistics related to the actions in the game such as points acquired, goals and levels met, who's winning, etc. As the gameplay progresses and the player advances further into the game, the content may become more interesting and followers may be become interested in viewing the gameplay.

After operation 706, the method can flow to operation 708 or operation 710. At operation 708, the method may include determining whether the followers have previously engaged in a particular scene or other similar scenes as the scene detected by operation 704. In some embodiments, operation 708 can use the profile data of the follower to determine whether the follower has engaged with a similar a scene in the past. For example, as noted above, operation 704 detects an upcoming scene that includes the player fighting the "Boss character." Based on the profile data of a follower, operation 708 determines that a particular follower primarily views content related to fashion and comedy, and has never viewed content that includes video games. As a result, operation 708 can infer that the follower may not be interested in viewing the content scene that involves the player fighting the "Boss character."

At operation 710, the method may include determining the influencer-follower viewing history. Operation 710 can determine whether influencer 102 has created content or watched content that is similar to the content scene detected by operation 704. For example, operation 710 determines that the content that the influencer 102 has watched in the past includes product reviews of electronic devices, combat related video games, and comedy skits. Accordingly, this data information can be used to determine whether the influencer and the followers of the influencer may be interested in viewing the particular content scene detected by operation 704.

The method flows to operation 712 where the operation is configured to predict whether followers will be interested in viewing a particular content on a content channel. In some embodiments, operation 712 may use the output of operation 708 and operation 710 to make the prediction. For example, as noted above, an upcoming content scene includes a player fighting the "Boss character." Using the output of operation 710, the operation determines that the influencer 102 has previously watched content that includes combat related video games. Accordingly, operation 712 may predict that the follower has an interest in viewing the player fighting the "Boss character."

The method flows to operation 714 where the operation is configured to correlate the content scene with a predicted follower traffic. For example, operation 714 may determine that the influencer channel is expecting a significant number of followers who are male teenagers that are predicted to connect to view content on the influencer channel Based on the gender and age group of the expected followers, operation 714 may make an inference that the male teenagers will be interested in viewing the content scene that includes the player fighting the "Boss character."

At operation 716, the method may include adding the recommended content channel with the total number of predicted followers onto the influencer interface 202. In some embodiments, the total number of recommended content channels to include onto the influencer interface 202 can be based on the preferences of the influencer 102. For example, the influencer 102 may only want a total of five recommended channels to be included in the influencer interface 202. In some embodiments, the recommended channels can be ranked based on the total number of predicted followers, engagement rate, engagement metrics, etc.

Figure 8:
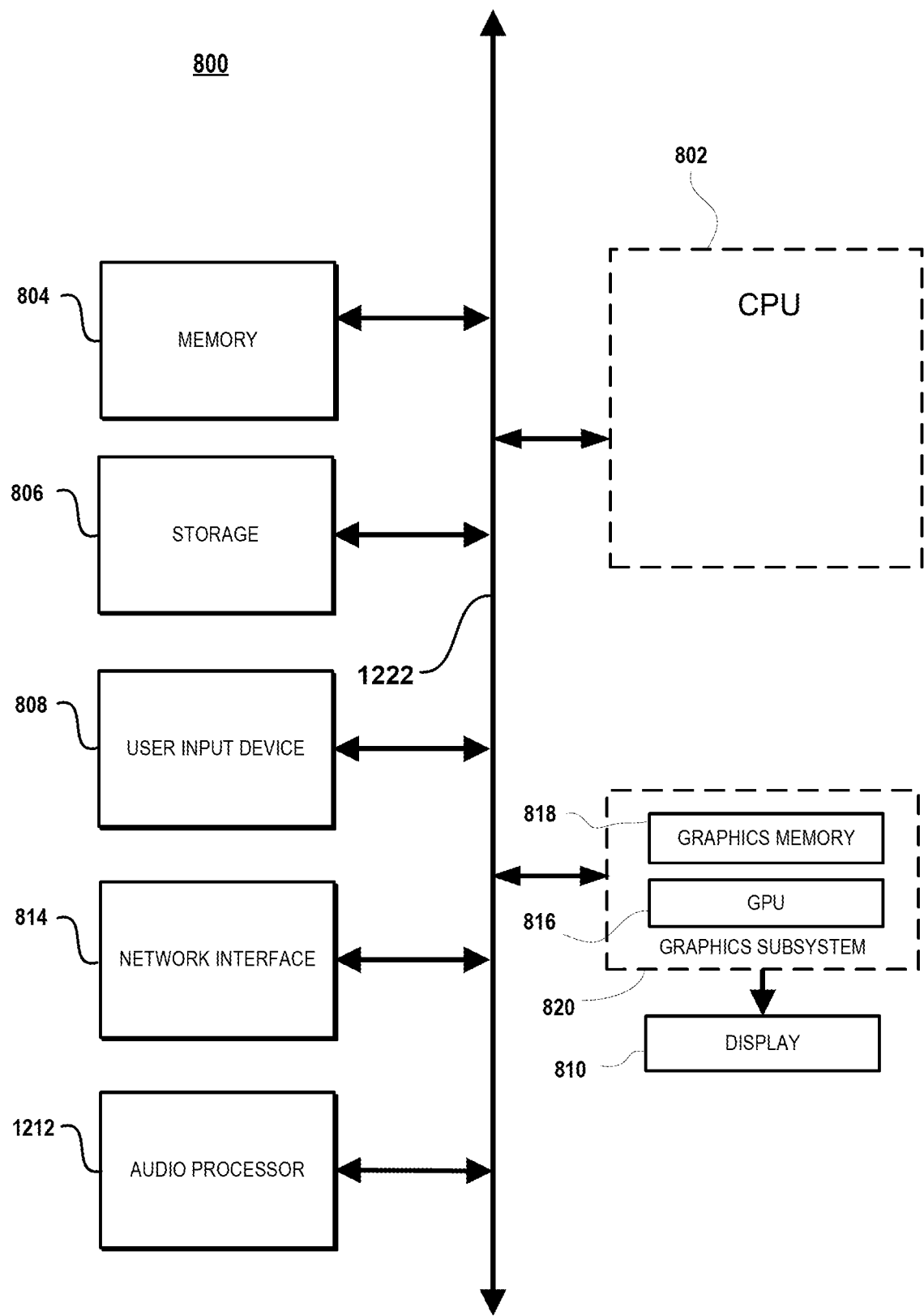
FIG. 8 illustrates components of an example device 800 that can be used to perform aspects of the various embodiments of the present disclosure.

FIG. 8 illustrates components of an example device 800 that can be used to perform aspects of the various embodiments of the present disclosure. This block diagram illustrates a device 800 that can incorporate or can be a personal computer, video game console, personal digital assistant, a server or other digital device, suitable for practicing an embodiment of the disclosure. Device 800 includes a central processing unit (CPU) 802 for running software applications and optionally an operating system. CPU 802 may be comprised of one or more homogeneous or heterogeneous processing cores. For example, CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 800 may be a localized to a player playing a game segment (e.g., game console), or remote from the player (e.g., back-end server processor), or one of many servers using virtualization in a game cloud system for remote streaming of gameplay to clients.

Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include keyboards, mice, joysticks, touch pads, touch screens, still or video recorders/cameras, tracking devices for recognizing gestures, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, memory 804, data storage 806, user input devices 808, network interface 810, and audio processor 812 are connected via one or more data buses 822.

A graphics subsystem 820 is further connected with data bus 822 and the components of the device 800. The graphics subsystem 820 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 808, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 810. Display device 810 can be any device capable of displaying visual information in response to a signal from the device 800, including CRT, LCD, plasma, and OLED displays. Device 800 can provide the display device 810 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for recommending content channels for an influencer, comprising:
   identifying a session of the influencer, the session includes a current content channel being viewed by the influencer and made available for streaming to one or more followers of the influencer, the current content channel is one of a plurality of content channels made available for viewing by the influencer;
   accessing, during the session, content data from the plurality of content channels, the content data is associated with gameplay of one or more players engaged in gameplay;
   accessing profile data of the followers of the influencer, the profile data includes content preferences of said followers;
   predicting engagement metrics for said followers of the influencer in relation to said plurality of content channels, the engagement metrics being updated in substantial real time based on change occurring with the content data in the plurality of content channels; wherein said predicting engagement metrics further comprises, processing signature features extracted from gameplay of the one or more players engaged in gameplay during the session;
   processing engagement features extracted from the content preferences of said followers;
   processing the signature features and the engagement features using classifiers of an engagement model, the engagement model is used to produce a recommendation for switching to said different content channel; and
   generating an influencer interface for presenting said predicted engagement metrics, the engagement metrics are configured to provide indicators of when engagement metrics for the current content channel indicate a predicted decrease relative to a predicted increase when switching to a different content channel from among the plurality of content channels available during the session.

2. The method of claim 1, wherein the predicted engagement metrics are used to produce recommendations for switching to different ones of the plurality of content channels during the session, wherein the plurality of content channels change over time during the session based on said one or more players engaged in gameplay.

3. The method of claim 1, wherein the content preferences of said followers are derived from a historical engagement in types of content in gameplay.

4. The method of claim 1, wherein the predicted decrease relative to the predicted increase is based on a higher number of followers predicted to view the different content channel as compared to the current content channel.

5. The method of claim 1, wherein the predicted decrease relative to the predicted increase is based on a higher amount of interactive feedback predicted for the different content channel as compared to the current content channel.

6. The method of claim 1, further comprising generating a notification to the influencer that one or more new content channels are available to view that are predicted to be of interest to the followers of the influencer.

7. The method of claim 1, wherein the engagement metrics being updated is based on calls to an engagement model to obtain predictions as to an updated engagement metrics while changes occur with the content data in the plurality of content channels.

8. The method of claim 1, wherein the engagement metrics include a total number of impressions, or total number of followers, or engagement rate, or sentiment score, or retention score.

9. The method of claim 1, wherein the classified signature features and the engagement features identifies a likelihood of the follower prefer viewing specific types of content.

10. The method of claim 1, wherein the influencer interface includes a headline, said headline providing information related to the content channels.

11. A non-transitory computer-readable storage medium storing a computer program, the computer-readable storage medium comprising:
   program instructions for identifying a session of the influencer, the session includes a current content channel being viewed by the influencer and made available for streaming to one or more followers of the influencer, the current content channel is one of a plurality of content channels made available for viewing by the influencer;
   program instructions for accessing, during the session, content data from the plurality of content channels, the content data is associated with gameplay of one or more players engaged in gameplay;
   program instructions for accessing profile data of the followers of the influencer, the profile data includes content preferences of said followers;
   program instructions for predicting engagement metrics for said followers of the influencer in relation to said plurality of content channels, the engagement metrics being updated in substantial real time based on change occurring with the content data in plurality of content channels; wherein said predicting engagement metrics further including: program instructions for processing signature features extracted from gameplay of the one or more players engaged in gameplay during the session;
   program instructions for processing engagement features extracted from the content preferences of said followers;
   program instructions for processing the signature features and the engagement features using classifiers of an engagement model, the engagement model is used to produce a recommendation for switching to said different content channel; and program instructions for generating an influencer interface for presenting said predicted engagement metrics, the engagement metrics are configured to provide indicators of when engagement metrics for the current content channel indicate a predicted decrease relative to a predicted increase when switching to a different content channel from among the plurality of content channels available during the session.

12. The storage medium as recited in claim 11, wherein the predicted engagement metrics are used to produce recommendations for switching to different ones of the plurality of content channels during the session, wherein the plurality of content channels change over time during the session based on said one or more players engaged in gameplay.

13. The storage medium as recited in claim 11, wherein the content preferences of said followers are derived from a historical engagement in types of content in gameplay.

14. The storage medium as recited in claim 11, wherein the predicted decrease relative to the predicted increase is based on a higher number of followers predicted to view the different content channel as compared to the current content channel.

15. The storage medium as recited in claim 11, wherein the predicted decrease relative to the predicted increase is based on a higher amount of interactive feedback predicted for the different content channel as compared to the current content channel.

16. The storage medium as recited in claim 11, further comprising program instructions for generating a notification to the influencer that one or more new content channels are available to view that are predicted to be of interest to the followers of the influencer.

17. The storage medium as recited in claim 11, wherein the engagement metrics being updated is based on calls to an engagement model to obtain predictions as to an updated engagement metrics while changes occur with the content data in the plurality of content channels.

18. The storage medium as recited in claim 11, wherein the engagement metrics include a total number of impressions, or total number of followers, or engagement rate, or sentiment score, or retention score.

* * * * *